May 31, 1932.  R. T. LOISEAU  1,860,422
METALLIC PIPE COUPLING
Filed Dec. 21, 1928  3 Sheets-Sheet 1

INVENTOR
RAOUL T. LOISEAU
BY *Wm. N. Cady*
ATTORNEY

INVENTOR
RAOUL T. LOISEAU
BY *Wm. N. Cady*
ATTORNEY

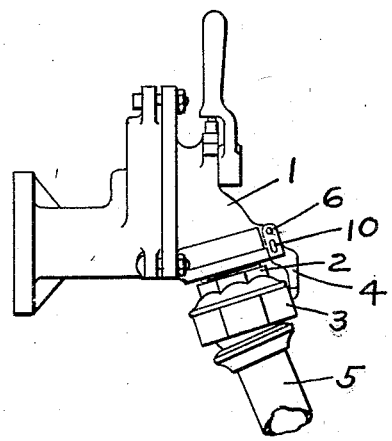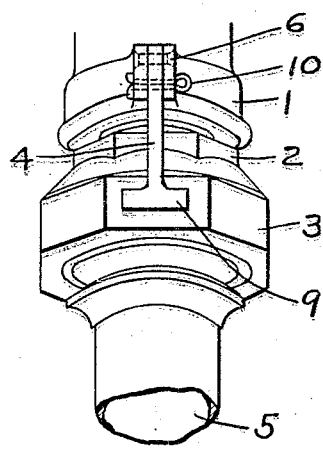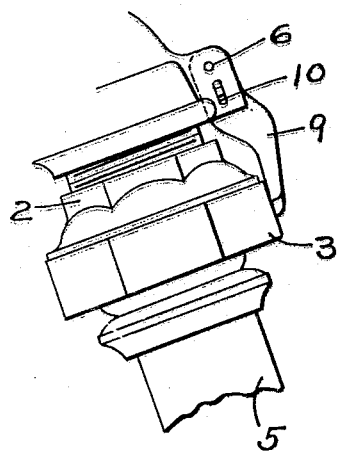

Patented May 31, 1932

1,860,422

UNITED STATES PATENT OFFICE

RAOUL T. LOISEAU, OF LIVRY-GARGAN, FRANCE, ASSIGNOR TO THE WESTINGHOUSE AIR BRAKE COMPANY, OF WILMERDING, PENNSYLVANIA, A CORPORATION OF PENNSYLVANIA

METALLIC PIPE COUPLING

Application filed December 21, 1928, Serial No. 327,693, and in France June 12, 1928.

This invention relates to metallic pipe couplings of the kind employed to establish communication between the steam heating or other conduits on the successive vehicles or train of railway or other vehicles.

As usually constructed couplings of this character comprise a ball or universal joint comprising a hollow external member, the internal surface of which is of spherical form to accommodate a corresponding spherical internal member in such a manner that the two members are capable of limiting the relative movement in all directions. The two members are held in engagement with one another by a collar member adapted to engage with the spherical surface of the internal member, this collar being internally screw-threaded and engaging with a corresponding screw-threaded portion on the external member. The collar member is provided externally with a number of plane faces and is preferably in the form of a hexagonal or octagonal nut so that the member can readily be rotated by means of a tool when it is required to assemble or disassemble the universal joint. The coupling is adapted to be connected to the end of the conduit on the vehicle or to an end cock provided on the vehicle, a portion of the external member being screw-threaded and adapted to cooperate with corresponding screw-threads in the angle cock or the like.

According to the present invention, arrangements are provided adapted to secure the parts of which the universal joint is composed in position when assembled as well as maintaining the connection between the coupling and the conduit or angle cock on the vehicle.

Figure 1:
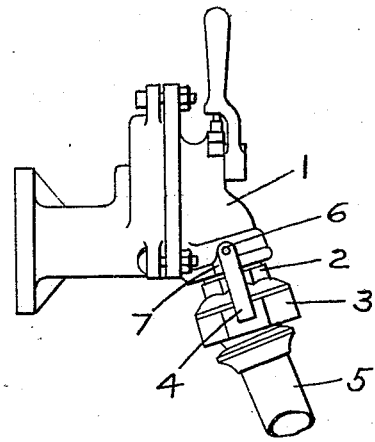
Figure 2:
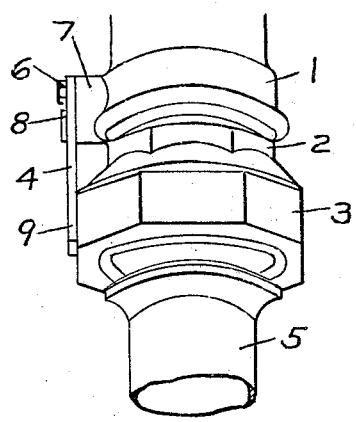
Figure 3:
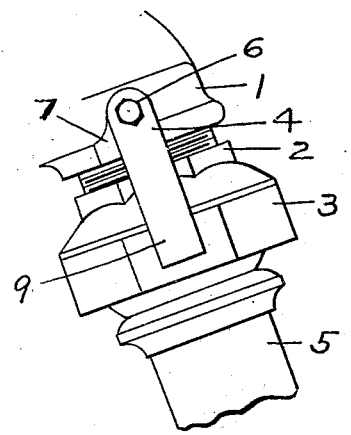
Figure 4:
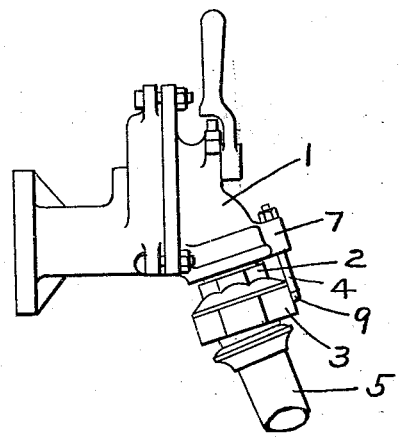
Figure 5:
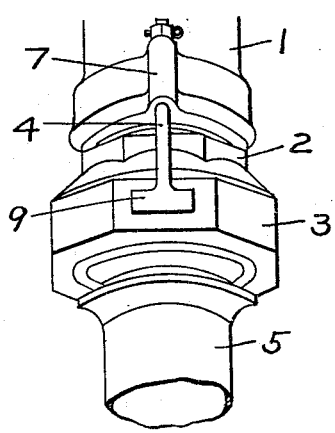
Figure 6:
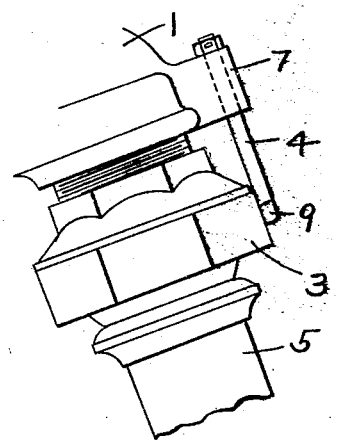

In order that the invention shall be clearly understood it will now be described by way of example only with reference to the accompanying drawings; in which Figure 1 is a side view of the universal joint portion of the coupling connected to an end cock of a steam heating conduit; Figure 2 is a front view on a larger scale of the universal joint portion of the coupling illustrated in Figure 1; Figure 3 is a side view on a larger scale of the universal joint portion of the coupling illustrated in Figure 1; Figures 4, 5 and 6 are views corresponding to Figures 1, 2 and 3 respectively of a modified embodiment of the invention; Figures 7, 8 and 9 are views corresponding to Figures 1, 2 and 3 respectively of a further modification of the invention.

Referring first to Figures 1, 2 and 3 it will be observed that the end cock 1 has secured thereto a coupling comprising a hollow external member 2 provided with screw-threads adapted to cooperate with corresponding screw-threads in the angle cock. Secured in the hollow external member 2 by means of an internally screw-threaded collar member 3 is a spherical internal member 5. Pivotally mounted upon an axis 6 provided on a boss 7 on the angle cock 1 is a plate 4, the extremity 9 of which is adapted to cooperate with one of the faces of the hexagonal or octagonal collar member 3, this plate being prevented from moving in a clockwise direction (Figure 1) by means of a shoulder 8 provided on the boss 7.

The collar member 3 is thus prevented by the plate 4 from rotating, under the influence of vibrations, in a direction which would cause the parts of the universal joint to become separated and the coupling as a whole is prevented from becoming disconnected from the angle cock under the influence of vibrations. In order to permit the rotation of the hollow external member 2 when securing the coupling to the cock and to permit the adjustment of the universal joint by the rotation of the collar member, the plate 4 is rotated about its axis 6 in an anti-clockwise direction out of engagement with the face of the hexagonal or octagonal collar member.

Referring now to Figures 4, 5 and 6 it will be observed that a rod 4 is provided in place of the plate illustrated in Figures 1 to 3, this rod having a flattened and branched end 9 adapted to cooperate with one of the plane faces of the hexagonal or octagonal collar member and being capable of movement in an axial direction in a lug 7 on the angle cock 1. The rod 4 is shown in its operative position in which it prevents rotation of the hollow external member 2 and of the collar member 3 under the influence of vibrations or the like.

When it is required to adjust the universal joint by rotation of the collar member 3 or to disconnect the coupling from the angle cock, the rod 4 is moved upwardly so that its end 9 comes out of engagement with the plane face of the collar member.

In the further modification of the invention illustrated in Figures 7 to 9 the member 4 is in the form of a lever pivotally mounted at 6 on a lug 7 on the angle cock 1, this lever 4 being adapted to be maintained in its operative position with its end 9 in engagement with a plane face of the collar member 3 by means of a split pin 10 which can be removed in order to enable the lever to be rotated so that its end 9 comes out of engagement with the collar member 3 whereupon the universal joint can be adjusted or the coupling removed from the angle cock.

It will be evident that the invention is not limited to the particular construction and arrangement of parts hereinabove described which may be varied as desired to suit particular requirements without exceeding the scope of the invention.

Having now described my invention, what I claim as new and desire to secure by Letters Patent, is:—

A pipe joint comprising a hollow external member, a special internal member, and a rotatable collar member for holding the external and internal members together and having a plurality of plane faces in the form of a nut, a supporting member to which said pipe joint is secured, a plate pivotally mounted on said supporting member and engaging one of said plane faces, and a stop carried by said supporting member and engaging said plate for preventing rotation of said plate in one direction, and thereby preventing rotation of the collar member in the same direction through the engagement of the plate with the plane face of the collar member.

In testimony whereof I have hereunto set my hand.

RAOUL T. LOISEAU.